(12) United States Patent
Ryan et al.

(10) Patent No.: US 8,407,245 B2
(45) Date of Patent: Mar. 26, 2013

(54) EFFICIENT STRING PATTERN MATCHING FOR LARGE PATTERN SETS

(75) Inventors: Matthew V Ryan, Spanish Fork, UT (US); Andrew Hodgkinson, Pleasant Grove, UT (US); Russell Young, Pleasant Grove, UT (US)

(73) Assignee: Microsoft Corporation, Redmond, WA (US)

( * ) Notice: Subject to any disclaimer, the term of this patent is extended or adjusted under 35 U.S.C. 154(b) by 136 days.

(21) Appl. No.: 12/953,469

(22) Filed: Nov. 24, 2010

(65) Prior Publication Data

US 2012/0130983 A1 May 24, 2012

(51) Int. Cl.
*G06F 7/00* (2006.01)
*G06F 17/30* (2006.01)

(52) U.S. Cl. .......................... 707/771; 707/803

(58) Field of Classification Search .................. 707/802, 707/715, 780, 771, 803
See application file for complete search history.

(56) References Cited

U.S. PATENT DOCUMENTS

| | | | |
|---|---|---|---|
| 6,047,283 A * | 4/2000 | Braun ................................... | 1/1 |
| 6,662,184 B1 * | 12/2003 | Friedberg ....................... | 707/754 |
| 7,054,855 B2 | 5/2006 | Basso et al. | |
| 7,058,663 B2 * | 6/2006 | Johnston et al. ...................... | 1/1 |
| 7,403,941 B2 * | 7/2008 | Bedworth et al. .................... | 1/1 |
| 7,636,703 B2 | 12/2009 | Taylor | |
| 2003/0144832 A1 * | 7/2003 | Harris ............................. | 704/10 |
| 2003/0233362 A1 * | 12/2003 | Nolan et al. ................... | 707/100 |
| 2007/0050335 A1 * | 3/2007 | Kashima et al. ................... | 707/3 |
| 2007/0150469 A1 * | 6/2007 | Simonyi ............................. | 707/6 |
| 2007/0198548 A1 * | 8/2007 | Lee ................................. | 707/100 |
| 2008/0177737 A1 * | 7/2008 | Eminovici ......................... | 707/6 |
| 2009/0175520 A1 | 7/2009 | Huynh et al. | |
| 2009/0293114 A1 | 11/2009 | Mustafa | |
| 2010/0017397 A1 * | 1/2010 | Koyanagi et al. ................. | 707/5 |
| 2010/0095064 A1 | 4/2010 | Aviles | |

OTHER PUBLICATIONS

Kärkkäinen, et al., "Faster Filters for Approximate String Matching", Retrieved at << http://www.siam.org/proceedings/alenex/2007/alx07_008karkkainenj.pdf >>, In Proceedings 9th Workshop on Algorithm Engineering and Experiments (ALENEX), SIAM, 2007, pp. 84-90.

(Continued)

*Primary Examiner* — Cam Truong
(74) *Attorney, Agent, or Firm* — Rau Patents, LLC

(57) ABSTRACT

A string matching system is described herein that provides for very fast and efficient pattern matching against large sets of certain types of pattern strings. If a set of pattern strings is comprised of strings that can be logically divided into segments, these pattern strings can be stored efficiently in a tree-like data structure, segment by segment, storing pattern-match syntax segments separately from literal string segments. After segmentation, individual match candidate strings are compared, segment by segment, against elements in the tree. The system uses a data structure that is conceptually a combination of a tree and a hash table. Using a hash table to implement the branching elements at each level in the tree contributes to quick matching speed at each level. By consistently separating strings into segments, the system can also share storage locations for like elements in the data structure.

15 Claims, 4 Drawing Sheets

OTHER PUBLICATIONS

Su, David Chi-Chuan., "Performance Analysis and Optimization on Lucene", Retrieved at << http://www.stanford.edu/class/archive/cs/cs276a/cs276a.1032/projects/reports/dsu800.pdf >>, pp. 6.

Shi, et al., "Approximate Multiple String Searching by Clustering", Retrieved at << http://www.jsbi.org/pdfs/journal1/GIW96/Oral/GIW96O04.pdf >>, 2010, pp. 8.

Man, et al., "Efficient and Robust Feature Extraction and Pattern Matching of Time Series by a Lattice Structure", Retrieved at << http://citeseerx.ist.psu.edu/viewdoc/download?doi=10.1.1.134.1920&rep=rep1&type=pdf >>, Ninth International Conference on Information and Knowledge Management, Nov. 06-11, 2000, pp. 271-278.

Schatz, et al., "Fast Exact String Matching on the GPU", Retrieved at << http://www.cbcb.umd.edu/software/cmatch/Cmatch.pdf >>, 2008, pp. 6.

\* cited by examiner

EFFICIENT STRING PATTERN MATCHING FOR LARGE PATTERN SETS

BACKGROUND

Numerous computer science problems involve searching strings of characters to find two matching or partially matching strings. Many types of data involve strings, including addresses, names, file paths, Uniform Resource Locators (URLs), and so forth. Strings can be stored in a variety of ways in a computer system, such as one or more characters terminated by a predetermined identifier (e.g., null-terminated strings) or counted data structures that store a string length and array of characters. String matching may include comparing a single source string to a single target string, comparing a single source string to a set of multiple target strings, comparing multiple source strings to multiple target strings, and so forth.

In many software applications, string matching consumes a significant quantity of the computer hardware resources (e.g., processor time or memory space). Modern desktop search programs often spend a large percentage of their execution time comparing a search query string with many possible matches in a search index. Thus, performance of applications can be noticeably affected by the algorithms and data structures selected by application developers to store and manipulate strings.

Standard techniques for matching a source string against a large set of target pattern strings are inefficient and expensive. For example, many techniques iterate through each potential target string, comparing characters until a mismatch is found before moving to the next potential target string. This technique increases in time for every new target string added to the set, and slows as the source string length gets longer.

SUMMARY

A string matching system is described herein that provides for very fast and efficient pattern matching against large sets of certain types of pattern strings. Pattern strings are strings that include one or more literal characters and/or wildcard characters that can match one or more literal characters. If a set of pattern strings is comprised of strings that can be logically divided into segments, these pattern strings can be stored efficiently in a tree-like data structure, segment by segment, storing pattern-match syntax segments separately from literal string segments. Pattern-match syntax segments may include "wild card" characters (e.g., "*" or "?") that can be replaced by one or more literal characters to form a match. After segmentation of candidate strings, individual match candidate strings can be compared, segment by segment, against elements in the tree to quickly determine if the candidate matches any of the original pattern strings. In some embodiments, the string matching system uses a data structure that is conceptually a combination of a tree and a hash table. Using a hash table to implement the branching elements at each level in the tree contributes to quick matching speed at each level. By consistently separating strings into segments, the system can also share storage locations for like elements in the data structure. Thus, the system allows fast string matching even with large data sets.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
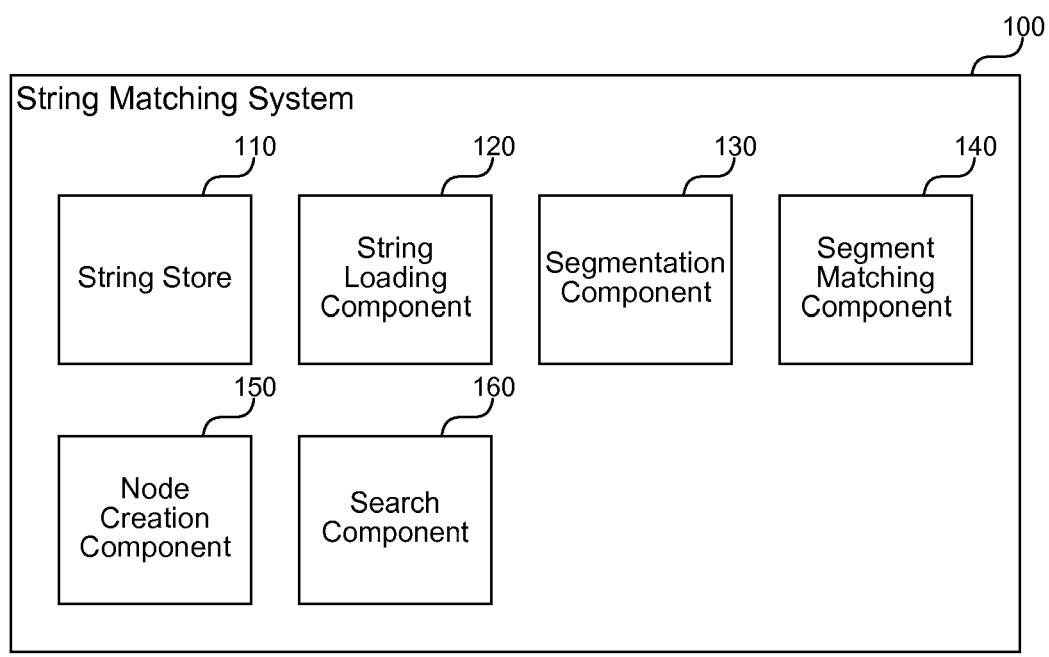
FIG. 1 is a block diagram that illustrates components of the string matching system, in one embodiment.

A string matching system is described herein that provides for very fast and efficient pattern matching against large sets of certain types of pattern strings. If a set of pattern strings is comprised of strings that can be logically divided into segments, these pattern strings can be stored efficiently in a tree-like data structure, segment by segment, storing pattern-match syntax segments separately from literal string segments. Pattern-match syntax segments may include "wild card" characters (e.g., "*" or "?") that can be replaced by one or more literal characters to form a match. After segmentation, individual match candidate strings can be compared, segment by segment, against elements in the tree to quickly determine if the candidate matches any of the original pattern strings. In some embodiments, the string matching system uses a data structure that is conceptually a combination of a tree and a hash table. Using a hash table to implement the branching elements at each level in the tree contributes to quick matching speed at each level. By consistently separating strings into segments, the system can also share storage locations for like elements in the data structure. Thus, the system allows fast string matching even with large data sets.

In some embodiments, the string matching system is applied to applications in which a goal is to determine, given a set of pattern strings and a separate match candidate string, whether any of the pattern strings in the set match the candidate string. One straightforward approach to solving this problem is to enumerate each pattern string in the set, compare it to the match candidate, and determine if there is a match. For example, given this set: "aaa", "bbb", "ccc", and the match candidate string "bbb", a common approach would first compare "bbb" to "aaa". Upon finding these strings do not match, the approach next compares "bbb" to "bbb" and, having found a match, processing terminates. For literal strings, as in this example, matching can be done more efficiently by using a hash table instead of enumerating each string and comparing values individually.

Additional flexibility can be provided by using some form of pattern matching syntax. If we assume that the '#' character is interpreted to mean "any alphabetic character", we could change our set to the following: "a##", "b##", and "c##". If the match candidate string is still "bbb", we would use the same technique and find that "bbb" matches "b##" by simply extending the matching algorithm to match any character to the '#' character. While this general approach is sufficient for small sets of pattern strings, the cost of finding a match increases linearly as the pattern strings become longer and as the set becomes larger. With very large sets of strings, the standard approach to this problem quickly becomes insufficient. Furthermore, once patterns are introduced, hash tables become useless for lookups because the match candidate strings will not generate the same hash values as the pattern strings that are stored.

The string matching system addresses this problem for certain types of pattern strings that are easily and consistently separable into segments and where pattern match portions can be separated into distinct segments from literal match portions. File paths are examples of strings that fit these rules. As an example, consider an automatic disk cleanup application. Configuration for this application may specify to delete all files in temporary directories and all files that end with the suffix "tmp" or "temp". Using an asterisk ("*") to represent a sequence of one or more matching characters, the list of pattern strings to represent this configuration might look like this: "/temp/*", "/home/*/temp/*", "*.tmp", and "*.temp". These strings meet the criteria specified. They are easily and consistently separable (the slash ("/") and period (".") characters are used to separate elements of the path specification), and the pattern match element, the asterisk ("*"), can be separated into its own segment.

Splitting the strings into segments offers two possible increases in efficiency. First, pattern matching is only performed on the smallest portions of the candidate match strings, not the entire string, limiting the scope in which less efficient pattern matching algorithms are employed. Second, comment elements can be preserved. As an extension of the previous example, suppose that instead of simply deleting all the files in each user's "temp" directory, the configuration wanted to specify that only certain types of files or files in certain subfolders be deleted:

```
"/home/*/temp/*.jpg"
"/home/*/temp/*.mp3"
"/home/*/temp/*.avi"
"/home/*/temp/downloaded-files/*"
"/home/*/temp/internet-cache/*"
"/home/*/temp/temporary-application-files/*"
```

The first three segments ("home", "*", and "temp") are the same for each of these pattern strings and can therefore be shared. To implement this technique, the string matching system creates a tree-like data structure that represents the pattern strings in a format that leverages the efficiencies described. The tree is comprised of a root node that acts as the starting access point to the data structure, and zero or more tree nodes that contain the pattern string data.

Figure 4:
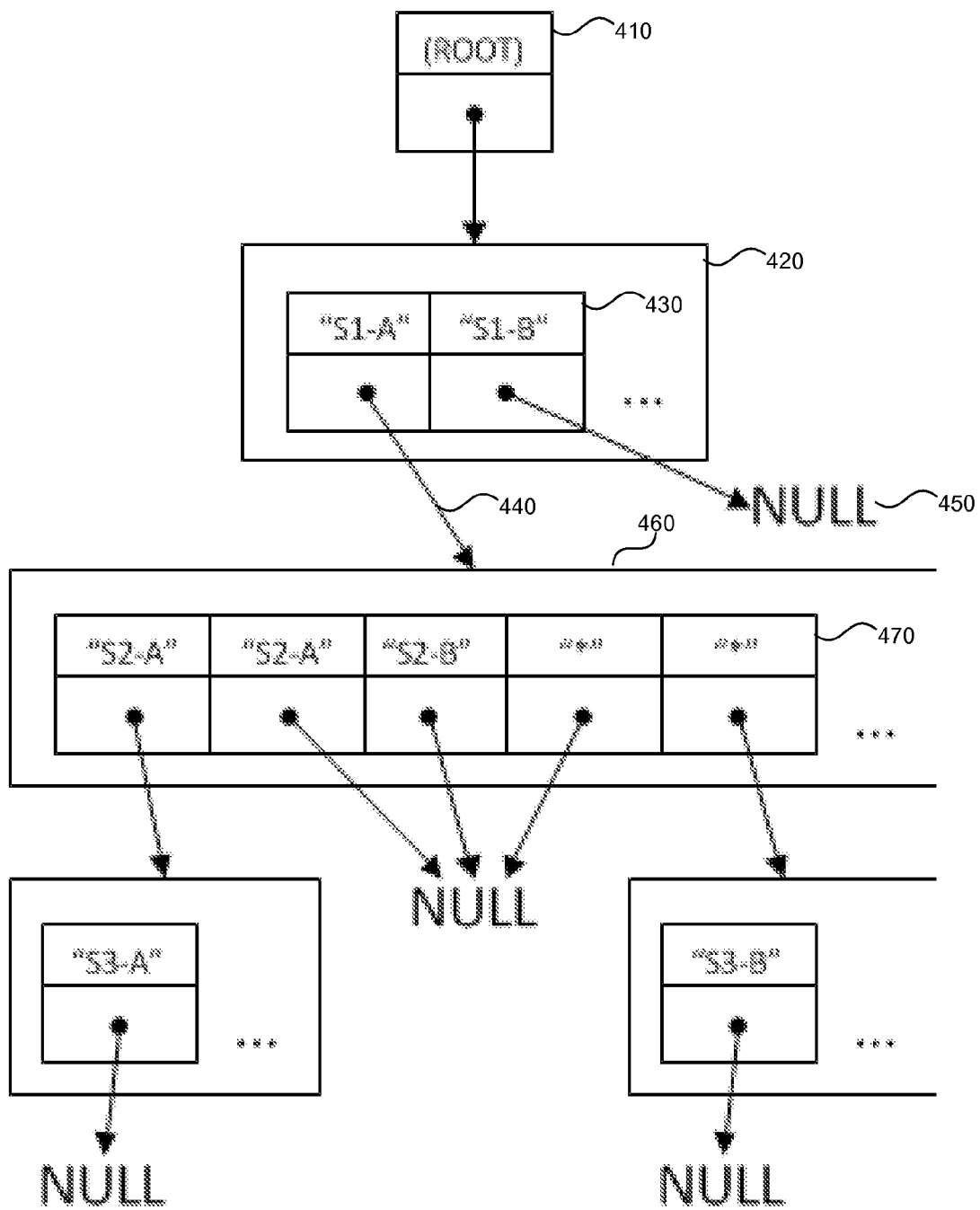
FIG. 4 is a data structure diagram that graphically illustrates contents of the string data store of the string matching system, in one embodiment.

Each tree node contains a hash table that associates a specific string segment with a reference to the node that contains the next segment for that pattern string (see FIG. 4 described further herein). Thus, if two pattern strings have the same segment in common at the same location in the string, they will share the hash table entry for that particular node. In some embodiments, segments are defined as being the same if: 1) the string values of both segments are identical (or can be considered identical based on a pattern match) and 2) the status of the segment as being the last segment in the string is the same (i.e., both segments represent the last segment in their respective strings, or both segments do not represent the last segment in their respective strings). Other factors may be considered as a part of the segment-matching test, depending on implementation. Once a differing segment is found, an entry will be created in that node's hash table for both of the distinct segments. Thus, both strings can be represented without unnecessarily duplicating storage. A hash table entry for the last segment of a string includes some indication that it is the last segment (shown in FIG. 4 as a NULL reference).

In some embodiments, storage of pattern strings in the data structure is as follows. The system first divides each string into segments (called segmentation herein). The system then stores each segment at the corresponding level in the tree structure according to the above rules described for the data structure (see FIG. 2 described herein). FIG. 4 represents the storage of the following set of pattern strings in the data structure described: "S1-A:S2-A:S3-A", "S1-B", "S1-A:*: S3-B", "S1-A:S2-B", "S1-A:*", and "S1-A:S2-A". Note that in this example the system can easily segment the strings at each colon (":"). For URLs, both periods (".") and slashes ("/" and "\") may be used to segment strings, as well as combinations of characters (e.g., "://" to separate "http" from a domain name) or other delimiters. Other domains may contain other logical divisions that the system can use to divide strings into segments. In some embodiments, the system may store empty segments in some cases. For example, for some implementations two delimiters in a row might be ignored while in other implementations such a combination may indicate an empty segment that has logical significance to the implementation.

Figure 3:
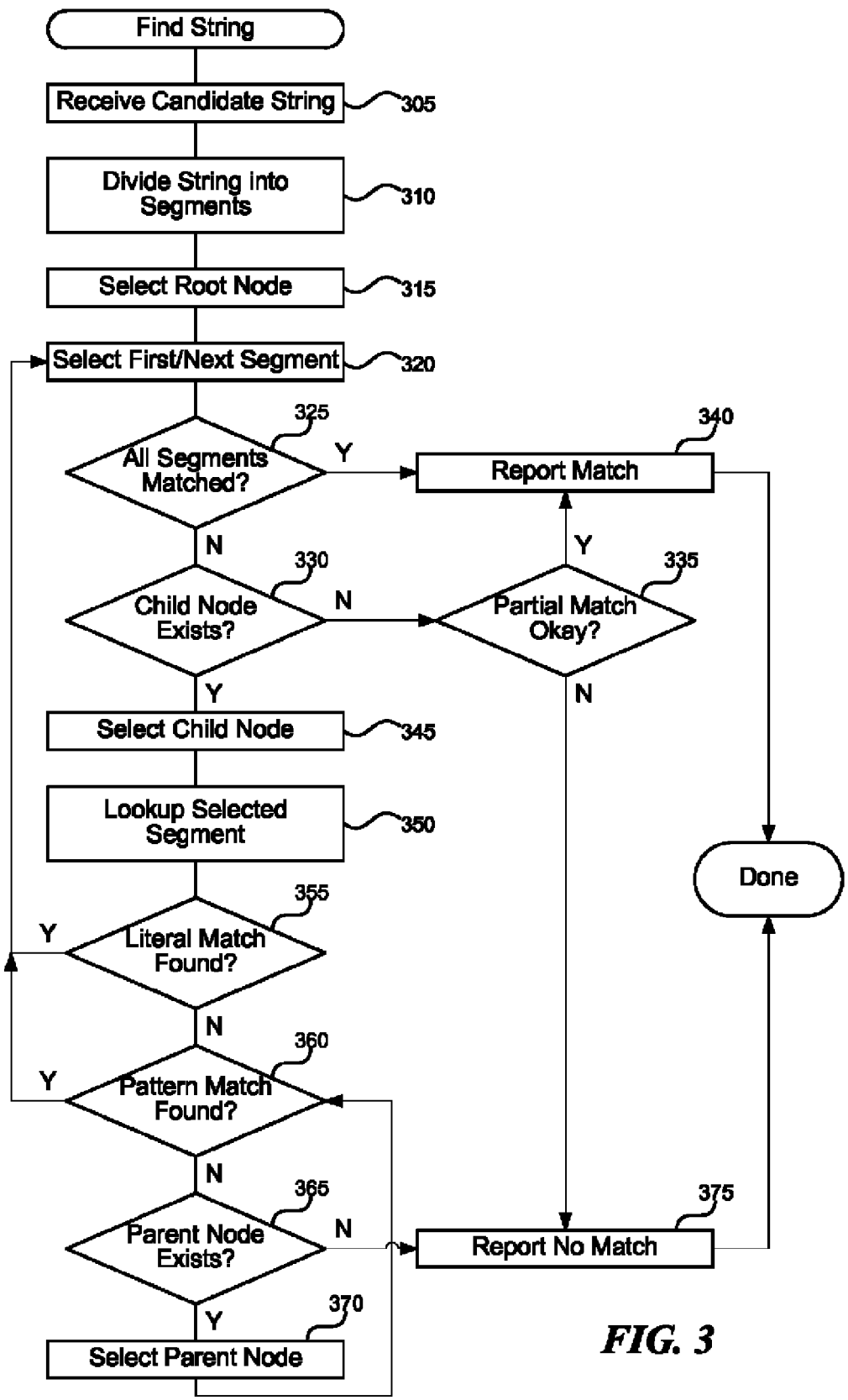
FIG. 3 is a flow diagram that illustrates processing of the string matching system to determine whether a candidate string matches any string stored in the string store, in one embodiment.

Determining whether a given string matches the set of pattern strings uses similar logic (see FIG. 3 described herein). The system divides the candidate string into segments, the same as the string would be if it were being stored in the data structure. Then, starting with the first segment of the string, the system tests for a match for the first segment in the hash table of the first node of the tree. The test for whether segments match is the same test that is used during storage, to determine whether a segment already exists or will be created. In other words, the status of the segment as the last in the string is considered as a part of the match test; again, other factors may be considered depending on implementation. If a match is found, the system follows the reference in the hash table to the next node, where a match for the next segment of the candidate string is sought.

While testing for a match, if no literal match is found in the current node's hash table for that candidate segment, the system then tests for a match against the pattern strings stored at that node. Those of ordinary skill in the art will recognize that this order can be reversed so that pattern strings are tested before literal matches in some implementations. If a match is found, the reference to the next node is followed and matching continues. If no match is found, logic is returned to the previous node where this same algorithm is applied. Lacking a match, the system continues applying the same logic to the previous node until there is no previous node or a match is found. If, at any point during the matching effort, the reference in the matching element of the hash table refers to no node (e.g. NULL), matching efforts are complete. The candidate string matches up to this point. If there are additional segments in the candidate string for which no match was found, then the system may declare a partial match, otherwise the system may declare no match. Whether partial matches are valid is implementation dependent. A partial match is any candidate string for which at least one segment has a match stored in the tree and at least one segment for which no match is stored in the tree. A full match is one in which all of the segments of the candidate string have matching segments stored in the tree.

The system is flexible to allow specific implementations to determine the criteria for what is a match, what is a partial match, or what is not a match, and the examples provided herein are merely to illustrate the capabilities of the system.

For example, suppose the string "http://www.abc.com/home" is stored in the data store. Then suppose the system receives the string "http://www.abc.com/home/index.html" to see if it matches. An implementation may decide that the candidate string matches even if the last part of the path ("index.html") is not included in the data store; in other words, the implementation may decide that the trailing parts of the path are not important for matching. However, another candidate string may be "http://www.abc.com" and in this case, it may be that not matching the "home" part of the path may mean there is NOT a match. Likewise, another candidate string "http://www.abc.net" may also be considered not a match because the domain name portion may be considered significant. Thus, the rules of the implementation, location within the pattern or candidate string, context, matching in other parts of the string, or any number of other conditions could apply in any particular case.

FIG. 1 is a block diagram that illustrates components of the string matching system, in one embodiment. The system 100 includes a string store 110, a string loading component 120, a segmentation component 130, a segment matching component 140, a node creation component 150, and a search component 160. Each of these components is described in further detail herein.

The string store 110 is a data store that stores data structures used by the string matching system 100 to hold a set of strings against which the system 100 searches for matches for a candidate string. The data store may include persistent or in-memory data storage devices, including one or more memory units, hard drives, file systems, databases, cloud-based storage services, or other facility for storing data. The string store 110 may include multiple instances of trees described herein used for matching candidate strings for different problem domains (e.g., a tree for matching URLs, a tree for matching file paths, and so forth). The string store 110 may also include a combination of in-memory and persistent data storage based on frequency of use/reference to each node, and other performance or implementation considerations.

The string loading component 120 loads one or more strings into the string store 110 by invoking the segmentation component 130 to divide the strings into segments and locating or creating nodes in the tree to store each string segment. The string loading component 120 may be invoked during a startup process that prepares a string data structure for use by an application that tests candidate strings for matches within the data structure. Alternatively or additionally, applications may add strings to the data structure as the application runs, by loading new strings as they are discovered or configured by an administrator, other user, or automated process. The string loading component 120 determines whether segments of the string to be loaded are already present in the data structure and adds nodes for segments that are not already present.

The segmentation component 130 divides one or more strings into logical segments based on one or more segmentation criteria. Many strings are such that they can be logically divided into independently recognizable or significant substrings. For example, Internet domain names can be divided by the periods (".") in the domain name and URLs can be divided by forward slashes ("/") or backward slashes ("\") as well as by periods (".") in the domain name portion of the URL, or any other method appropriate to a particular implementation. Implementers of the string matching system may provide one or more segmentation criteria for dividing strings according to the problem domain address by their particular application. The segmentation component 130 applies the segmentation criteria to divide strings received from the string loading component 120 to be loaded into the tree stored by the string store 110 and also to divide candidate strings provided by the search component 160 so that the system can determine whether particular segments of the candidate string match one or more stored strings.

The segment matching component 140 performs a segment-by-segment match of a candidate string to one or more stored strings to identify segments of the strings that match. A match may be determined as a literal character match or by matching one or more literal characters to one or more pattern-match specifications. For example, some implementations may allow wildcard characters in the stored strings, candidate strings, or both, and matches may be determined by expanding these wildcards to match characters provided in the subject string. The segment matching component 140 may also determine other criteria, such as whether the status of two segments as marking the end of a string or not marking the end of a string is the same. In some embodiments, the system stores segments that do not mark the end of a string separately (e.g., as separate hash table entries) from those segments that do mark the end of a string. The segment matching component 140 applies these and any other application-specific criteria to determine whether two segments will be declared a match. When adding strings to the string store, the segment matching component 140 determines whether an input string to be loaded is already represented in the string store 110 and, if not, can invoke the node creation component 150 to add a new node or hash table entry to the tree.

The node creation component 150 creates new nodes or hash table entries to represent string segments in the tree of stored strings. For example, as strings with more segments are loaded into the tree and no existing node represents the latter segments, the component 150 may create new nodes and add a reference from previous nodes to store the new string segments. Each node has a hash table and each created new node includes a new hash table with the strings located at that level. If a node already exists that is suitable for a particular segment, but no matching entry for that segment is found in the hash table, the node creation component 150 may add a hash table entry to represent the segment. Likewise, if the end status of the segment does not match the end status of an existing matching string segment, then the component 150 may add a new hash table entry based on the new end status.

The search component 160 receives a candidate string and searches the string store 110 for one or more matching strings. The search component 160 invokes the segmentation component 130 to divide the candidate string into segments similar to how strings loaded into the string store were previously divided into segments. Then, the search component 160 invokes the segment matching component 140 to perform a segment-by-segment match of the segments of the candidate strings to the segments of string stored in the string store 110. If a segment is found in the string store 110 that matches each segment of the candidate string, then the search component 160 declares a match and may return any metadata associated with the matching string entry. If no match is found for any segment of the candidate string, then the search component 160 may report no match. Some implementations may support partial matches and may report a portion of the candidate string for which a match is available in the string store 110.

The computing device on which the string matching system is implemented may include a central processing unit, memory, input devices (e.g., keyboard and pointing devices), output devices (e.g., display devices), and storage devices (e.g., disk drives or other non-volatile storage media). The memory and storage devices are computer-readable storage media that may be encoded with computer-executable instructions (e.g., software) that implement or enable the system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, set top boxes, systems on a chip (SOCs), and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
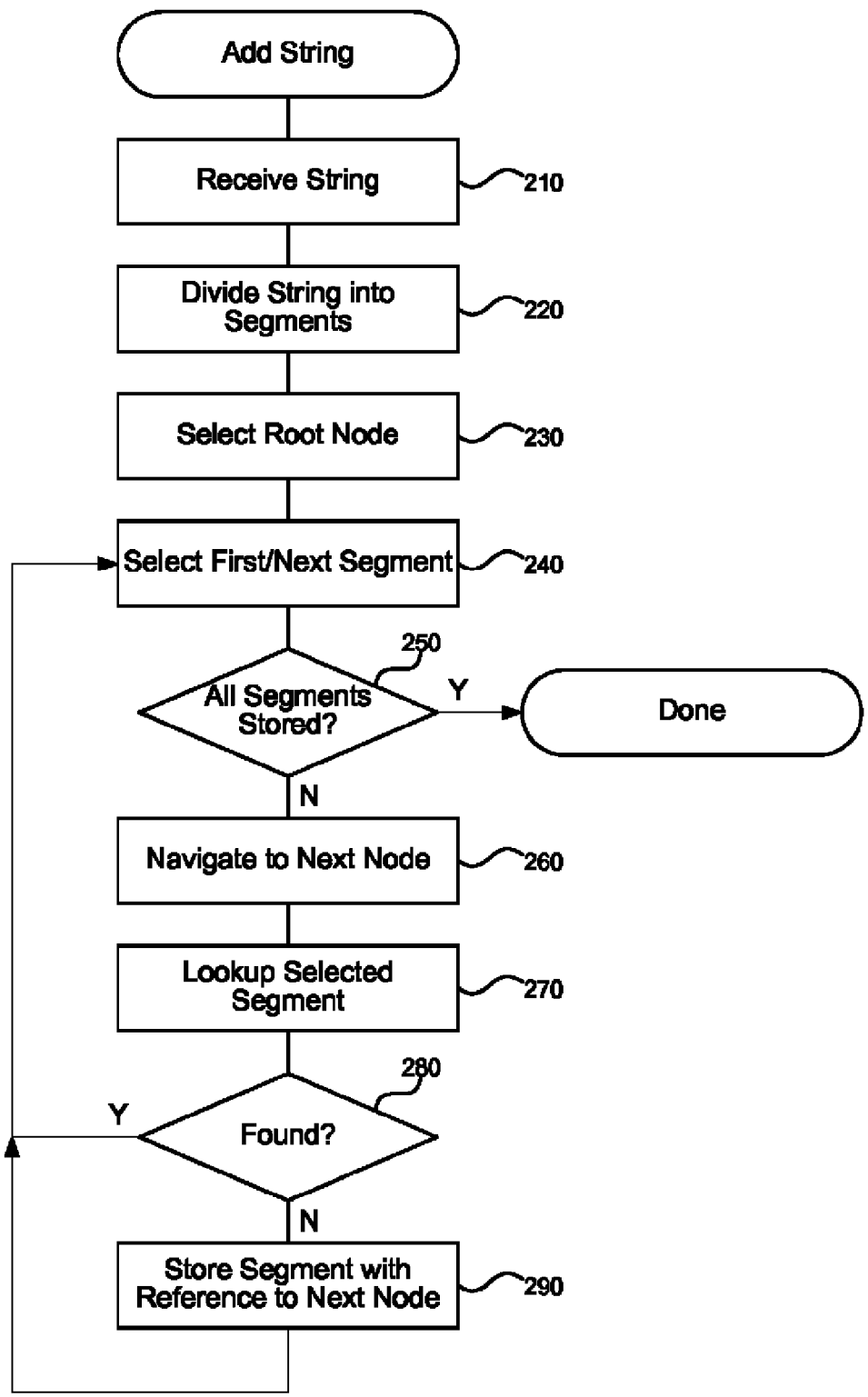
FIG. 2 is a flow diagram that illustrates processing of the string matching system to store new strings in the string store against which candidate strings will be matched, in one embodiment.

FIG. 2 is a flow diagram that illustrates processing of the string matching system to store new strings in the string store against which candidate strings will be matched, in one embodiment. Beginning in block 210, the system receives a string to be added to the string data store. The system may receive the string from an application (e.g., in an extensible markup language (XML) file or as a parameter to an application programming interface (API)), as user input, via a network interface, or from another source. The system adds the string to a store of strings against which to attempt to match later-received candidate strings using the following steps. Continuing in block 220, the system divides the received string into one or more segments. The system may identify segments based on one or more delimiting characters (e.g., periods or slashes), a count of characters (e.g., every four characters is a segment), or other segmentation criteria suitable for a particular application.

Continuing in block 230, the system selects a root node of the string data store that identifies an entry to a data structure for efficiently storing a set of strings in a tree-like form. For example, the data store may include a node for each level in the tree that represents a different possible following segment for the previous node. At the top is the root node that provides a reference to the first node in the data structure. Each node of the tree may include a hash table or other data structure for efficiently looking up matching strings at that level of the tree. Continuing in block 240, the system selects the first segment of the received string. In some embodiments, the system may reorder segments to increase efficiency of storage or for other reasons. For example, domain names often have the most significant portion at the end, while virtual paths in a URL often have the most significant portions at the beginning. Thus, for a URL, the system may reverse the segments of the domain name portion (e.g., "com"→"microsoft" instead of "microsoft"→"com"). On subsequent iterations, the system selects the next segment of the string in the order determined.

Continuing in decision block 250, if the system determines that all segments of the received string have been stored in the string data store, then the system completes, else the system continues in block 260. The system processes each segment in turn until each segment has been processed. Continuing in block 260, the system navigates to the next node of the string data store. For example, if the current node is the root node, then navigating to the next node places the system at the level of a hash table containing the first set of string segments with which previously stored strings begin. If there is no additional node but the string to be stored contains additional segments, a new node is created that is referenced by the hash table entry of the current node, at which point the system navigates to the newly created node. As the system navigates deeper in the string data store, navigating to the next node follows a reference from the previous matching segment to determine whether a subsequent node matches the next segment of the received string.

Continuing in block 270, the system performs a look up at the current node to determine whether the current string segment is already stored in the string data store at a current level. The system may use a hash table at each node of the string data store and the look up may perform a look up using a hash key derived from the current string segment. If a matching string segment is found, then a string like the received string up to the current segment has previously been stored in the data store.

Continuing in decision block 280, if the system found a matching string segment, then the system loops to block 240 to select the next segment, else the system continues at block 290. Continuing in block 290, the system stores the non-matching segment as a new entry in the string data store at the current level, then loops to block 240 to select the next segment. If the system is using a hash table, then this block adds a new entry to the hash table that includes a reference to a new node that represents any subsequent segments in the received string. After block 290, these steps conclude.

FIG. 3 is a flow diagram that illustrates processing of the string matching system to determine whether a candidate string matches any string stored in the string store, in one embodiment. Beginning in block 305, the system receives a candidate string for which to search the string store to identify zero or more matches to the candidate string. The candidate string is provided by an application for a purpose specific to the application. For example, an anti-malware application may compare a received file path to a set of file paths stored in the string store that refer to interesting file locations (e.g., system or temporary files).

Continuing in block 310, the system divides the received string into one or more segments. The system may identify segments based on one or more delimiting characters (e.g., periods or slashes), a count of characters (e.g., every four characters is a segment), or other segmentation criteria suitable for a particular application. The system divides the candidate string using the same segmentation criteria used to initially store strings in the string store. Continuing in block 315, the system selects a root node of the string data store that identifies an entry to a data structure for efficiently storing a set of strings in a tree-like form. For example, the data store may include a node for each level in the tree that represents a different possible following segment for the previous node. At the top is the root node that provides a reference to the first node in the data structure. Each node of the tree may include a hash table or other data structure for efficiently looking up matching strings at that level of the tree.

Continuing in block 320, the system selects the first segment of the received string. In some embodiments, the system may reorder segments to increase efficiency of storage or for other reasons. For example, domain names often have the most significant portion at the end, while virtual paths in a URL often have the most significant portions at the beginning. Thus, for a URL, the system may reverse the segments of the domain name portion (e.g., "com"→"microsoft" instead of "microsoft"→"com"). On subsequent iterations, the system selects the next segment of the string in the order determined.

Continuing in decision block 325, if the system determines that all segments of the received string have been matched to one or more segments stored in the string data store, then the system continues at block 340, else the system continues at block 330. The system processes each segment in turn until each segment has been matched or it is determined that there is no matching string in the string store. Continuing in decision block 330, if a child node exists for the current node, then the system continues at block 345, else the system continues at block 335. A child node indicates that further potentially matching segments are available in the string store. Because the test in block 325 indicates that there are more segments to the candidate string, there will also be more segments in the string store unless no match exists in the string store.

Continuing in decision block 335, if partial matches are allowed and at least one previous segment had a match (or other criteria determined by the particular implementation of the system), then the system continues at block 340 to report a partial match, else the system continues at block 375 to report no match. Continuing in block 340, the system reports a match. The match may be full or partial, depending on application-specific preference. A full match indicates that some string previously stored in the string store matched the candidate string, either literally or by applying pattern-matching wildcard characters. The system may report a match by returning a return value in response to an API call, providing a text response, or other common methods of reporting results.

Continuing in block 345, the system selects the child node of the current matching segment in the string store. This is the child node determined to exist in block 330. The child node contains a hash table or other data structure that identifies segments of strings stored at the current level of the string store. Continuing in block 350, the system performs a look up at the current node to determine whether the current string segment matches a segment previously stored in the string data store at a current level. The system may use a hash table at each node of the string data store and the look up may perform a look up using a hash key derived from the current string segment. If a matching string segment is found, then a string like the received string up to the current segment has previously been stored in the data store.

Continuing in decision block 355, the system determines whether a literal match for the current segment was found. If a literal match is found, then the system loops to block 320 to access the matching record and retrieve a reference to a node in the string store containing subsequent segments that may match the next segment(s) of the candidate string. If no literal match is found then the system continues in block 360 to identify pattern matches.

Continuing in decision block 360, if the system determines that a pattern match exists, then the system loops to block 320 to continue processing the next candidate string segment. In some embodiments, the system separates processing of literal string matches from pattern string matches. As noted herein, pattern strings are not typically well suited to inclusion in a hash table because they will not generate the same hash key as a literal candidate string segment that matches the pattern, leading to failure to find the matching pattern string in the hash table. The system may perform slower or alternative processing to iterate through pattern strings and determine whether any match the provided candidate string segment.

Continuing in decision block 365, if the system determines that a parent node of the current node exists, then the system continues at block 370, else the system continues at block 370 to report no match. Because patterns can be inclusive enough to span multiple segments, a failure to find a match at a particular level of the string store is not indicative of no match. By navigating to the parent level (potentially multiple times), the system searches for pattern matches at higher levels that may encompass the current candidate string segment. For example, a pattern string "http://www.*", where "*" is a wildcard pattern for matching any characters, would match with many potential candidate strings having many more segments than this target pattern string. Continuing in block 370, the system selects the parent node and loops to block 360 to determine whether a pattern match exists by comparing the current segment of the candidate string to the parent node's string patterns.

Continuing in block 375, the system reports that no match was found for the candidate string. The system may report no match by returning a return value in response to an API call, providing a text response, raising an exception, or other common methods of reporting results. After block 375, these steps conclude.

FIG. 4 is a data structure diagram that graphically illustrates contents of the string data store of the string matching system, in one embodiment. FIG. 4 represents the storage of the following set of pattern strings in the data structure described: "S1-A:S2-A:S-A", "S1-B", "S1-A:*:S3-B", "S1-A:S2-B", "S1-A:*", and "S1-A:S2-A". Note that in this example the system can easily segment the strings at each colon (":"). The data structure starts with a root node 410 that contains a pointer to the first node 420 of the data structure containing strings. Each string-containing node contains a hash table or other data structure that makes finding matching segments at that level efficient. For example, the first node 420 includes a hash table 430. The hash table 430 contains the strings "S1-A" and "S1-B" because these encompass the potential first segment values of all of the strings stored in the string store. Note that even though there are six strings stored in the string store, data that is similar for multiple strings may not be duplicated at each level, resulting in significant space savings.

The "S1-A" value in the hash table 430 contains a reference 440 to the second node 460. The second node 460 represents string segments that can follow "S1-A" for strings stored in the string store. The second node 460 contains its own hash table 470 with both literal strings and pattern-match strings. Note that in the embodiment illustrated, the system separately stores segments that represent the end of a string from segments that point to further segments. The segment value "S1-B" in the first node 420 points to a NULL reference 450 that indicates that no further segments follow that instance of "S1-B" for data presently stored in the string store. In the second node 460 hash table 470, the value "S2-A" is stored twice, once for strings that end in "S2-A" and again for strings that continue with one or more other segments. The data structure described allows for both space-efficient storage and fast matching of a candidate strings to the strings stored in the string store.

In some embodiments, the string matching system uses a Boolean value to indicate segment termination for partial matches. In implementations where partial matches are allowed (i.e., are treated as matches), then the system may distinguish segments that end a string with a simple Boolean value rather than a null terminator or other delimiter. This allows the strings loaded in the string store to continue on, potentially beyond the length of provided candidate strings.

In some embodiments, the string matching system combines node type or other application criteria at each segment to determine a match. For example, node types may include scheme (e.g., http), domain (e.g., .com), address (e.g., facebook), directory, and so forth. The system may test that a candidate string's segments have both a matching type and a matching value at each level before declaring a match. This allows an administrator that specifically wants to match a specific address or other part of a string to a string to distinguish type-based matches from standard string matches.

As noted herein, the system may accept partial matches based on application-specified preferences. In some embodiments, the string matching system allows the application to determine particular portions of strings for which partial matches are accepted. For example, using URLs, a particular application may allow partial matches for the virtual directory portion of the URL, but not for the domain name. The system may provide settings for partial matching that include a text description, such as "always", "never", "only after address", and so forth.

In some embodiments, the string matching system facilitates faster updates of the string data store using the data structure described herein. Because the string data is subdivided as described herein, updates only affect the leaf nodes of each string or the farthest current segment in the string store that is also in the string to be added. Because updates often lock the data structure being updated to prevent interference by other threads, the subdivision described herein limits the level at which a lock is needed, so that updates are less likely to impact nodes that are currently being used in a search. The system can quickly lock the furthest node to which the added string pertains, then unlock that node after the update. During that time, searches for strings that do not visit that node are unaffected by the update lock.

From the foregoing, it will be appreciated that specific embodiments of the string matching system have been described herein for purposes of illustration, but that various modifications may be made without deviating from the spirit and scope of the invention. For example, although strings have been described, the techniques described herein can also be used with other types of data, such as binary streams. Anti-virus software, for example, often scans executable code for known malicious binary streams. The system described can store particular binary streams to be matched against input streams to identify malicious software code. Accordingly, the invention is not limited except as by the appended claims.

We claim:

1. A computer-implemented method for determining whether a candidate string matches any string stored in a string data store, the method comprising:

invoking the method during a startup process that prepares a string data structure for use by an application that tests candidate strings for matches within the string data structure, the string data structure holding a set of string in one or more instances of a tree-like form against a large pattern of strings;

receiving a candidate string from the application, wherein the candidate string is specific to the application, for which to search the string data store to identify zero or more matches to the candidate string;

dividing the received candidate string into one or more segments by dividing the candidate string using a same segmentation criteria used to previously store strings in the string data store;

selecting a root node of the string data store that identifies an entry to a data structure for efficiently storing a set of strings in a tree-like form, the root node comprising at least one segment common to all segmented strings in the string data store;

searching the string data store segment-by-segment to identify segments that match the segments of the candidate string;

upon determining that each segment in the candidate string matches a segment stored in the string data store, reporting that the candidate string matches a string stored in the string data store, by declaring a match and returning metadata associated with the matching string;

upon determining that a segment in the candidate string does not match a segment stored in the string data store, creating a new entry in the string data store;

updating the sting store with new strings without locking access to all of the strings in the string data store; and wherein the preceding steps of the dividing, selecting and searching are performed by at least one processor.

2. The method of claim 1 wherein receiving the candidate string comprises receiving the string from the application through an application-programming interface (API) provided by a string matching system.

3. The method of claim 1 wherein dividing the received string into segments comprises identifying segments based on one or more delimiting characters that separate segments.

4. The method of claim 1 wherein each node of the tree after the root node includes a hash table that allows efficiently looking up matching strings at the node's level of the string data store.

5. The method of claim 1 wherein searching the string data store segment-by-segment comprises: selecting a first segment of the received candidate string and the child node of the root node of the data structure, and looking up the first segment of the received candidate string in a data structure associated with the child node.

6. The method of claim 1 wherein searching the string data store segment-by-segment comprises determining that the candidate string partially matches a string stored in the string data store, and reporting the partial match.

7. The method of claim 1 wherein at least one string stored in the string data store includes a pattern match segment with at least one wildcard character that represents one or more optional characters to match in the candidate string.

8. The method of claim 1 wherein searching the string data store segment-by-segment comprises, at each level of the tree data structure, determining whether there are any literal match strings and if no literal matches are found, searching zero or more pattern match strings for a pattern match.

9. The method of claim 1 wherein searching the string data store segment-by-segment comprises performing a data structure look up at one or more nodes in the tree data structure that include a matching segment for a segment in that candidate string.

10. The method of claim 1 further comprising, upon determining that no string segments at a current tree node match a current candidate string segment, navigating to an ancestor node of the current node, navigating to a previous candidate string segment, and determining whether any pattern match strings segments associated with the ancestor node match the previous candidate string segment.

11. The method of claim 1 further comprising, upon determining that at least one segment of the candidate string does not match a segment stored in the string data store, reporting that no match was found for the candidate string.

12. A computer system for fast and efficient pattern matching against large sets of pattern strings, the system comprising:
- a processor and memory configured to execute software instructions embodied within the following components;
- a string data store configured to store one or more data structures that hold a set of strings in one or more instances of a tree against the large sets of pattern strings which the system searches for matches to a candidate string, each instance of the one or more instances of the tree configured for matching candidate strings for a different problem domain;
- a string loading component configured to load one or more strings into the string data store by invoking a segmentation component to divide the strings into segments and locating or creating nodes in the tree to store each string segment, configured to be invoked during a startup process that prepares a string data structure for use by an application that tests the candidate strings for matches within the string data structure, and further configured to update the string data store with new strings without locking access to all of the strings in the string data store;
- the segmentation component configured to divide the one or more strings into logical segments based on one or more segmentation criteria, and configured to apply the segmentation criteria to divide the strings received from the string loading component to be loaded into the tree stored by the string data store and also to divide the candidate strings provided by a search component so that the system can determine whether particular segments of the candidate string match one or more stored strings;
- a segment matching component configured to perform a segment-by-segment match of the candidate string to one or more stored strings to identify segments of the strings that match;
- a node creation component configured to create new entries to represent string segments in the tree of stored strings; and
- the search component configured to receive the candidate string from the application, the candidate string is specific to the application, and search the string data store for one or more matching strings, the search component further configured to invoke the segmentation component to segment the candidate string according to how strings are loaded in the string data store and to invoke the segment matching component, the search component further configured to declare a match and return metadata associated with a matching string found in the string data store when the candidate string matches the matching string in the string data store.

13. The system of claim 12 wherein the string data store is further configured to include a combination of in-memory and persistent data storage based on frequency of use of each node in a tree data structure for storing strings.

14. The system of claim 12 wherein the segment matching component is further configured to determine literal character matches and pattern matches with one or more wildcard characters.

15. The system of claim 12 wherein the segment matching component is further configured to determine whether a status of a first segment as marking the end of a string and a second segment as marking the end of a string is the same.

* * * * *